(12) United States Patent
Mahieux et al.

(10) Patent No.: US 7,503,801 B2
(45) Date of Patent: Mar. 17, 2009

(54) COVER CAP

(75) Inventors: Celine Mahieux, Birmenstorf (CH); Ulrich Wagner, Constance (DE); Paulo Gomes De Lima, Wettingen (CH); Pierre Hallet, Brussels (BE)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 11/752,381

(22) Filed: May 23, 2007

(65) Prior Publication Data
US 2007/0270023 A1 Nov. 22, 2007

Related U.S. Application Data

(63) Continuation of application No. PCT/EP2005/055952, filed on Nov. 14, 2005.

(30) Foreign Application Priority Data
Nov. 24, 2004 (CH) .................................... 1931/04

(51) Int. Cl.
*H01R 13/52* (2006.01)
(52) U.S. Cl. ...................... 439/521; 439/892
(58) Field of Classification Search ................ 439/519, 439/521, 750, 892; 174/138 F
See application file for complete search history.

(56) References Cited

U.S. PATENT DOCUMENTS

| 3,132,202 | A | * | 5/1964 | Wolf | 174/87 |
| 3,483,310 | A | * | 12/1969 | Krup | 174/87 |
| 4,839,470 | A | * | 6/1989 | Ventura | 174/84 R |
| 4,849,580 | A | * | 7/1989 | Reuter | 174/92 |

FOREIGN PATENT DOCUMENTS

| DE | 42 37 079 | | 5/1994 |
| JP | 60 028733 | | 2/1985 |
| JP | 1-286271 | * | 11/1989 |
| WO | 01/56135 | | 8/2001 |

* cited by examiner

*Primary Examiner*—Tho D Ta
(74) *Attorney, Agent, or Firm*—Darby & Darby

(57) ABSTRACT

The present invention relates to a cover cap for a connection of two electrically conductive interconnected ends of two winding bars of a stator of an electric machine. The cover cap includes an electrically insulating housing that surrounds and seals a circumference of the connection when mounted. The cover cap has a spring device disposed in an interior of the housing and configured to be clipped onto the connection so as to mount the housing and is supported on the connection on said housing when the housing is mounted so as to provide a force for fixing the housing to the connection.

20 Claims, 4 Drawing Sheets

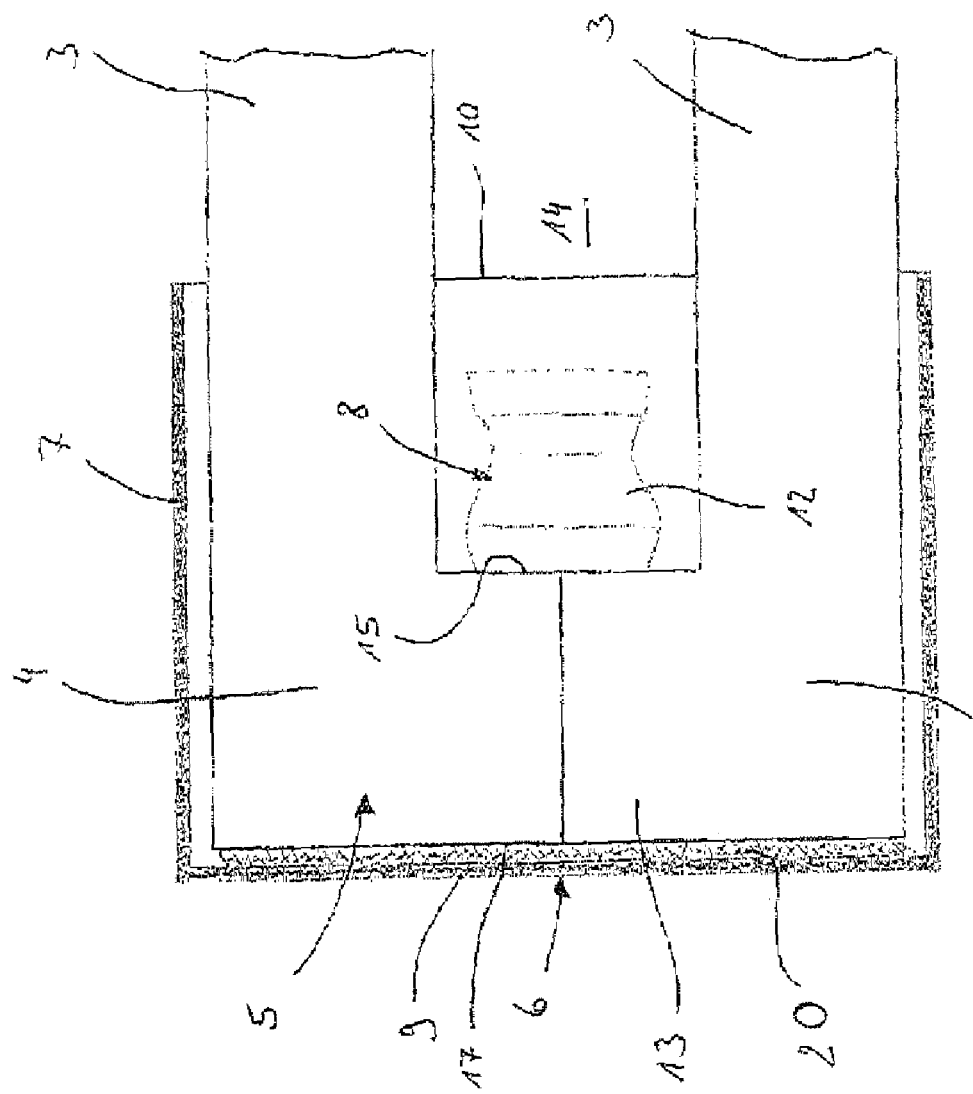

COVER CAP

This application is a continuation of International Patent Application No. PCT/EP2005/055952, filed on Nov. 14, 2005, which claims priority to Swiss Patent Application No. CH 01931/04, filed on Nov. 24, 2004. The entire disclosure of both applications is incorporated by reference herein.

The present invention relates to a cover cap for an assembly comprising two ends, of two winding bars of a stator of an electrical machine, the ends being electrically conductively connected to one another. The invention also relates to a stator which is equipped with covers such as these.

BACKGROUND

In a stator of an electrical machine, particularly in the case of a generator or in the case of an electric motor, for example in a power station, a stator winding is formed from individual winding bars, so-called transposed conductors, which are passed out of the stator at its axial ends and are connected to one another in some suitable form, for example in order to form poles of the winding. For this purpose, two winding bars are in each case electrically conductively connected to one another at their ends, for example by being soldered to one another. The ends that are connected to one another in this case form an assembly, which must be externally protected and, in particular, electrically insulated. Cover caps of the type mentioned initially are used for this purpose, and are plugged onto the respective assembly for this purpose. A cover cap such as this comprises an electrically insulating housing which, in the installed state, sheaths the respective assembly such that its circumference is closed. Cover caps such as these may have a housing which is closed at one end, or a housing which is open at both ends. A cover cap with a housing which is closed at one end may, for example, be plugged onto the respective assembly and may then be encapsulated with an adhesive, in particular synthetic resin. In the case of a cover cap with a housing which is open at both ends, the assembly may have twine impregnated with an adhesive, in particular synthetic resin, wound around it before the cover cap is fitted. Both variants are extremely time-consuming and require careful handling in order to avoid contamination of the surrounding area, in particular of the stator, with the adhesive.

SUMMARY OF THE INVENTION

The present invention relates to the problem of specifying an improved embodiment for a cover or for a stator equipped with such a cover including a simple fitting of the cover.

According to the present invention the cover cap is fixable to the assembly by spring loading. For this purpose, the present invention provides a housing equipped with a spring device which makes it possible to plug the housing onto the assembly and which, when in the plugged-on state, produces a holding force which fixes the housing sufficiently firmly on the assembly. This design allows the cover cap according to the invention to be fitted to the respective assembly particularly easily and cleanly. The fitting of the stator and of the ends of the winding bars that are connected to one another can thus be carried out particularly quickly. This considerably simplifies the amount of effort required for fitting of the cover caps and thus of the stator.

According to one preferred embodiment, the spring device may have at least one spring which is provided with a semi-conducting coating in order to reduce the corona effect. This makes it possible to reduce or avoid the corona effect, which can occur at the normally uninsulated ends of the winding bars in the assembly, within the cover cap.

Further important features and advantages of the present invention can be found in the dependent claims, in the drawings and in the associated description of the figures, with reference to the drawings.

BRIEF DESCRIPTION OF THE DRAWINGS

Preferred exemplary embodiments of the invention will be explained in more detail in the following description and are illustrated in the drawings, in which the same reference symbols relate to identical, similar or functionally identical components. In the figures, in each case schematically:

FIG. 6 shows a longitudinal section as in FIG. 3, but on a section plane rotated through 90°.

DETAILED DESCRIPTION

Figure 1:
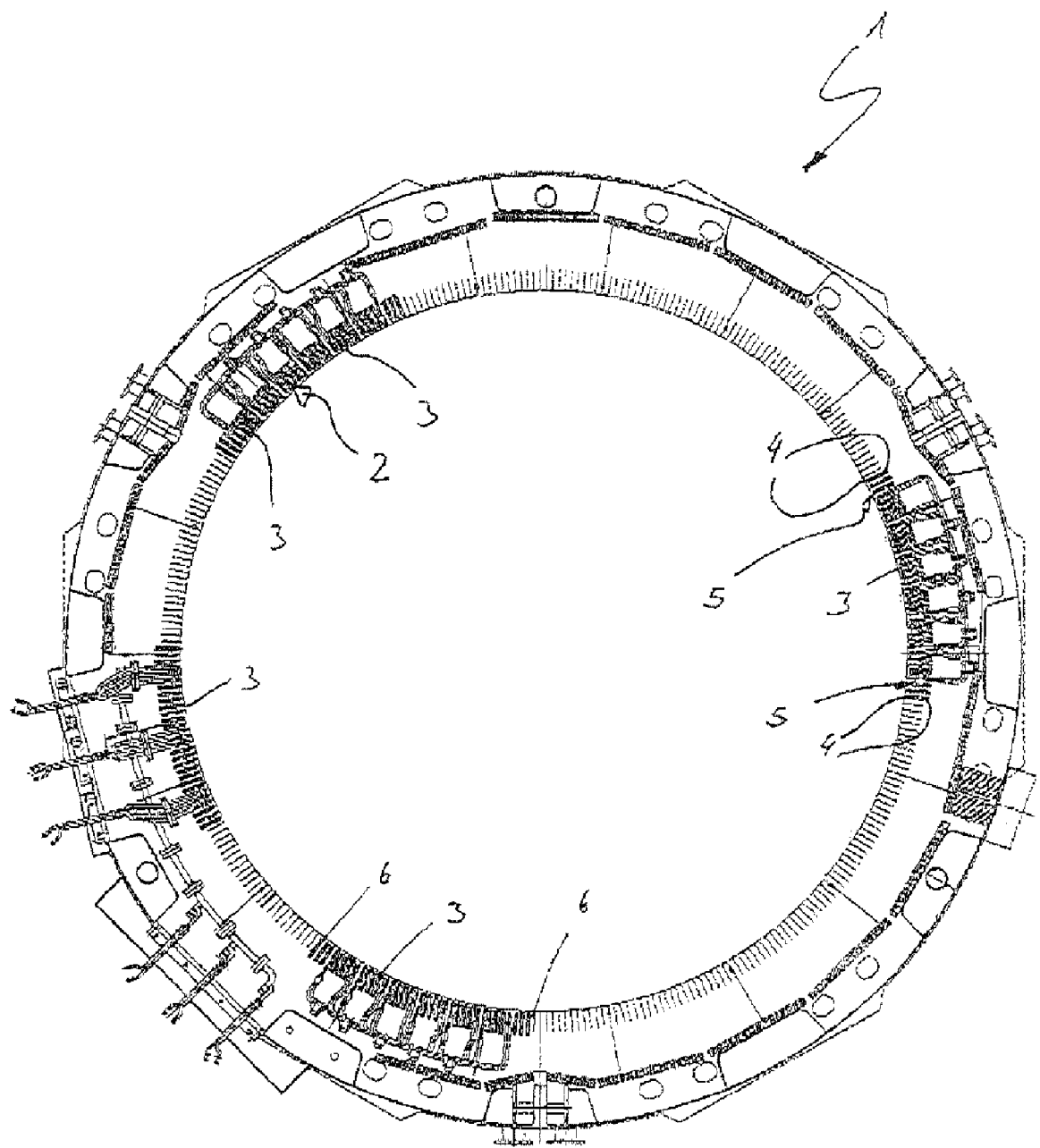
FIG. 1 shows an axial view of a stator.

As shown in FIG. 1, a stator 1 of an electrical machine, which is otherwise not illustrated, for example a generator or an electric motor, preferably in a power station, has a stator winding 2 which is formed from a multiplicity of individual winding bars 3, which are passed axially out of the stator 1. In this case, two winding bars 3 are in each case electrically conductively connected to one another at their ends 4, with those ends 4 which are connected to one another forming an assembly 5. An assembly 5 such as this is covered by a cover cap 6 in the stator 1 according to the invention.

Figure 2:
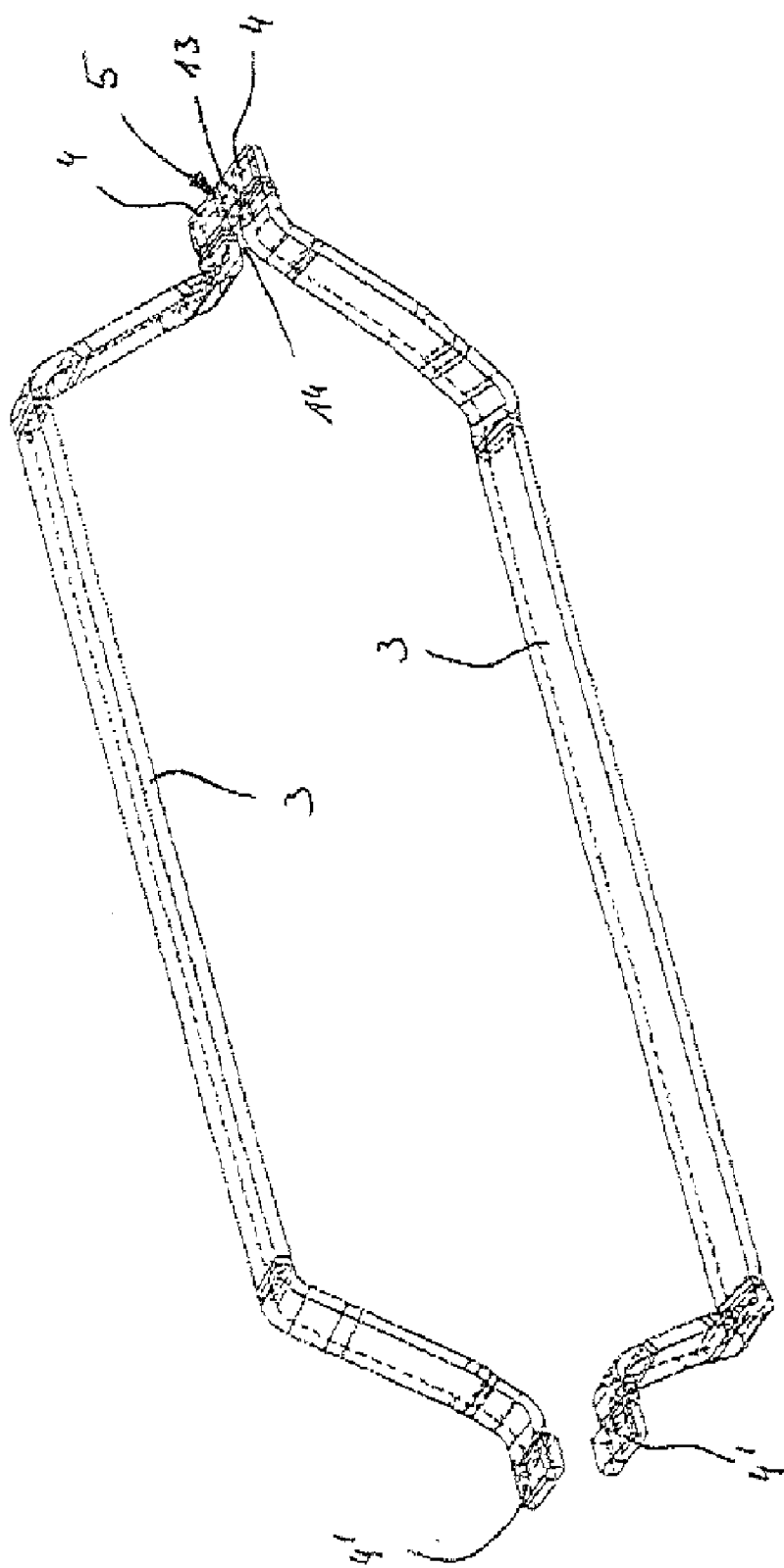
FIG. 2 shows a perspective view of two winding bars.

FIG. 2 shows two winding bars 3, which are electrically conductively connected to one another at their ends 4 on the right in FIG. 2, in particular by being soldered or welded to one another, and form the said assembly 5. The cover cap 6 is not shown in FIG. 2. At their ends 4' remote from the assembly 5, the winding bars 3 can be connected in fundamentally the same manner to the ends of other winding bars. These winding bars 3 are generally so-called "transposed conductors".

In a corresponding manner to that shown in FIGS. 3 to 6, a cover cap 6 such as this has a housing 7 and a spring device 8. In the installed state, the cover cap 6 is fitted to the respective assembly 5, and covers it on the outside.

The housing 7 is expediently composed of an electrically insulating material, for example a plastic. The housing 7 can be closed at one end with the aid of a base 9, as in the embodiments shown in FIGS. 3, 4 and 6, or may be open at both ends, as in the embodiment shown in FIG. 5. In any case, in the installed state, the housing 7 sheaths the assembly 5 such that its circumference is closed.

The spring device 8 is arranged in the interior of the housing 7. The spring device 8 is designed such that an open face 10 of the housing 7 can be plugged onto the assembly 5 for installation. This means that the spring device 8 is designed such that it does not impede the process of plugging the cover cap 6 onto the assembly 5. Furthermore, the spring device 8 is designed such that, in the installed state, it is supported on the one hand on the assembly 5 and on the other hand on the housing 7. In addition, the spring device 8 is designed such that, in the installed state, it produces a holding force which fixes the housing 7 on the assembly 5. The holding force is symbolized by arrows, and annotated with 11, in FIGS. 3 to 5.

In the embodiments shown here, the spring device 8 has at least one spring 12. In the examples shown here, the spring device 8 is in each case equipped with two springs 12. In this case, the two springs 12 are arranged in the housing 7 such that they are diametrically opposite, and therefore, in the installed state, are positioned on both sides of the assembly 5. It is clear that, from a different embodiment, the spring device 8 requires only a single spring 12, and further embodiments may also have more than two springs 12.

The springs 12 are attached to the housing 7. For example, the springs 12 are adhesively bonded into the housing 7. It is likewise possible for the springs 12 to be integrated in the housing 7, even during its production. By way of example, the housing 7 is cast from plastic, in particular using an injection-molding process, with the springs 12 being embedded in the plastic, that is to say being encapsulated or extrusion-coated. This simplifies the production of these cover caps 6.

The springs 12 may be produced from a conventional spring material, for example spring steel. However, in one preferred embodiment, the springs 12 are composed of a plastic that is suitable for this purpose and which, in particular, may be fiber-reinforced, in particular with carbon fibers and/or glass fibers being suitable for fiber reinforcement. Furthermore, the plastic may optionally be provided with an electrically conductive additive. This makes the springs 12 semi-conducting, which is advantageous in order to reduce the corona effect which can occur at the ends 4 in the region of the assembly 5. Additionally or alternatively, the springs 12 can also be provided with a semi-conducting coating, which likewise contributes to reducing the corona effect.

In the embodiments described here, the springs 12 are in the form of wave spring washers. Wave spring washers 12 such as these may be shaped with relatively little effort, such that they can produce the desired plugging-on behavior and the desired holding force.

The springs 12 project into the interior of the housing 7 in such a manner that, in the installed state, they are supported on the outside of the assembly 5 and are thus loaded. This results in the spring loading producing the desired holding force.

As can be seen from FIGS. 2 and 6, a lateral web 13 is formed in the assembly 5, via which the two ends 4 are connected to one another. The two ends 4 are at a distance from one another as far as this lateral web 13. A corresponding gap between the ends 4 is annotated 14 in FIGS. 2 and 6. The two ends 4 are also electrically connected in the area of this lateral web 13. As can also be seen from FIGS. 2 and 6, the web 13 may at least partially be formed at least one of the ends 4.

The lateral web 13 and the arrangement of the ends 4, which are otherwise at a distance from one another, result in the formation of an undercut 15 in the assembly 5, and this is used, in the case of the cover cap 6 according to the invention, by the spring device 8 in order to fix the cover cap 6 to the assembly 5. In one variant, an undercut 15 such as this may also be formed in a different manner, for example by means of a step at least one of the ends 4.

Figure 3:
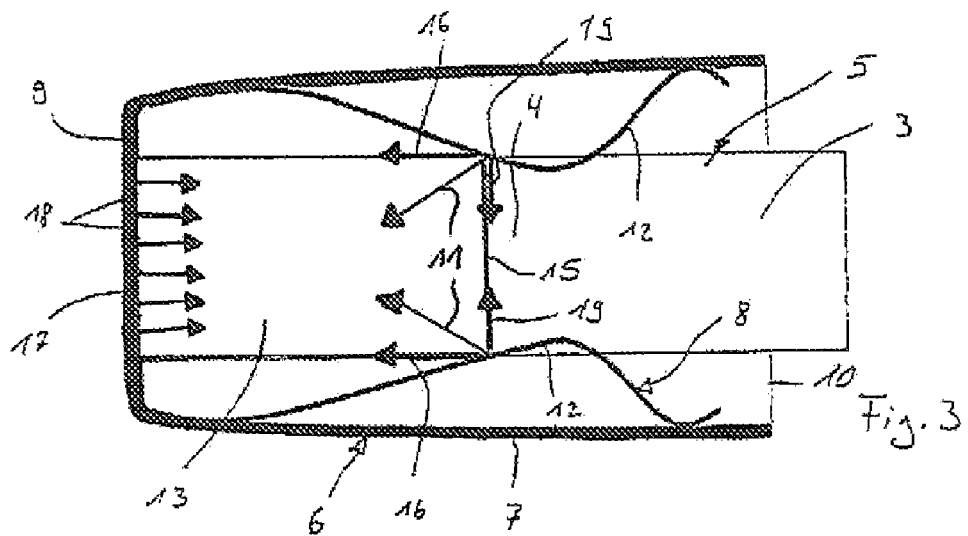
FIG. 3 shows a longitudinal section through an assembly with a cover cap.
Figure 4:
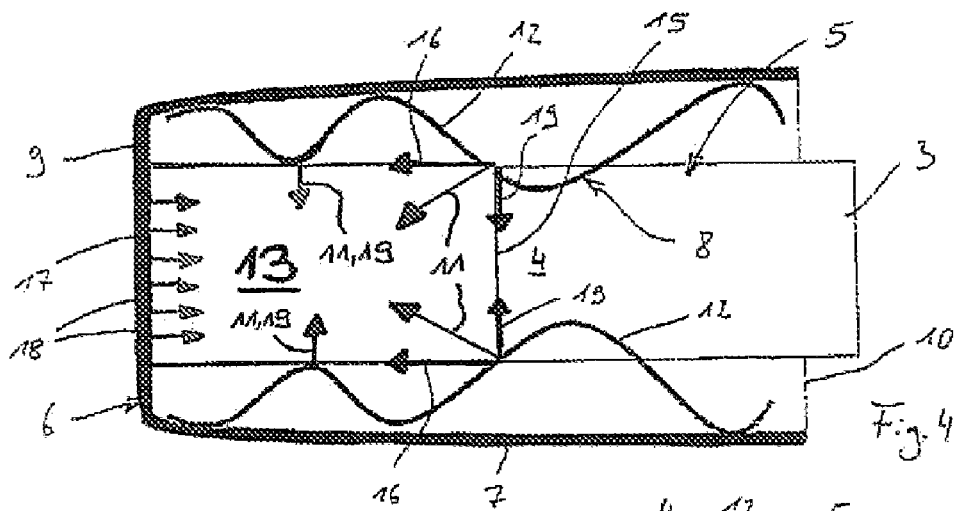
FIG. 4 shows a longitudinal section as in FIG. 3, but of a different embodiment.

As shown in FIGS. 3, 4 and 6, the springs 12 can be designed such that, in the installed state, they engage behind the said undercut 15. Furthermore, the springs 12 are designed such that, in the installed state, they produce a holding force 11, which has a component 16 (represented by arrows) which is oriented such that it drives the housing 7 with its base 9 against one end 17 of the assembly 5. This end 17 is that end of the assembly 5 which enters the housing 7 when the cover cap 6 is being plugged on. In the embodiments in FIGS. 3 and 4, the base 9 in this case comes to rest directly on said end 17 and is supported on it by a corresponding resultant force 18, symbolized by arrows. This results in the cover cap 6 being secured particularly effectively against being pulled off the assembly 5.

In another embodiment, the bracing of the base 9 against the end 15 can in general be replaced by bracing of an inward-projecting contour of the housing 7 against a corresponding matching contour on the assembly 5. This bracing principle can accordingly be implemented without any problem for a housing 7 that is open at both ends, as in FIG. 5, as well.

Furthermore, the springs 12 are in this case designed such that, in the installed state, they generate a holding force 11 which has a component 19 (symbolized by an arrow) which acts orthogonally on the housing 7 and/or on the assembly 5. The orthogonal component 19 leads to bracing between the assembly 5 and the housing 7, transversely with respect to the pulling-off direction. Resultant friction forces must then be overcome in order to pull the cover cap 6 off, and these forces may be made sufficiently great by using appropriate material combinations. Furthermore, the orthogonal component 19 leads, with the aid of the two springs 12, to the springs 12 clamping the assembly in between them, in the installed state. At the same time, this results in the cover cap 6 being centered on the assembly 5, assuming that the two springs 12 are designed appropriately symmetrically.

The embodiment shown in FIG. 4 differs from that shown in FIG. 3 in that its springs 12 each have an additional contact zone, for introduction of the orthogonal component 19, in the area of the lateral web 13. This makes it possible to increase the total pulling-off force, that is to say the force which is required to remove the cover cap 6 from the assembly 5 again.

Additional security for the cover cap 6 on the assembly 5 can be provided by adhesive bonding 20. Adhesive bonding 20 such as this, for example composed of synthetic resin, allows the housing 7 to additionally be fixed on the assembly 5. By way of example, the spring device 8 is then used for quick fitting, and provides adequate resistance to pulling off for installation purposes. The respective adhesive is in this case expediently applied at a suitable point while the cover cap 6 is actually being plugged onto the housing 7, and can then cure at a later time in order to provide the respectively desired increased resistance to pulling off. The adhesive-bonded joint 20 is expediently arranged in the area of the base 9, thus making it possible to provide a contact pressure, which assists the strength of the adhesive-bonded joint 20, with the aid of the force component 18, which presses the base 9 against the end 17 of the assembly 5, until the adhesive-bonded joint 20 has cured. It is obvious that other areas can additionally or alternatively be provided with adhesive as well, in contrast to the embodiment shown in FIG. 6.

Figure 5:
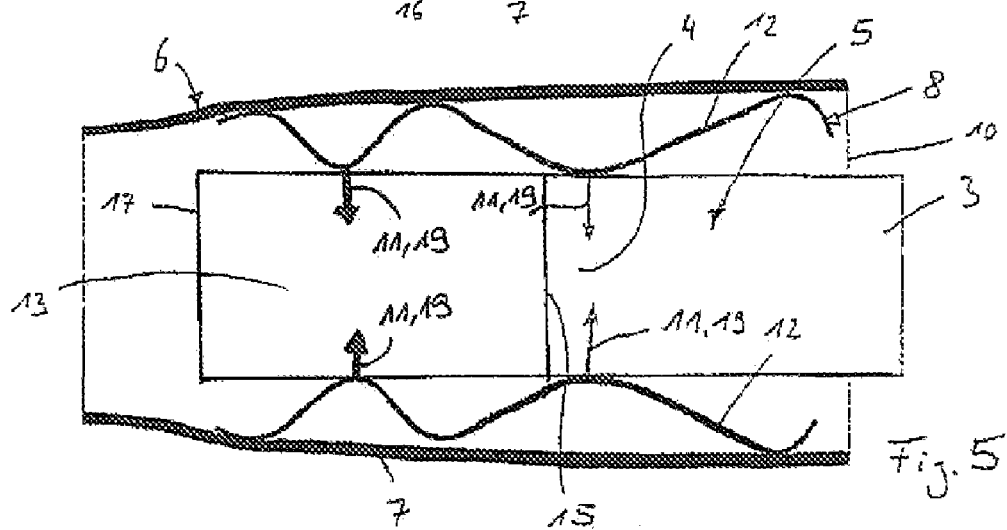
FIG. 5 shows a longitudinal section as in FIG. 3, but of a further embodiment.

As shown in FIG. 5, in the case of an open embodiment of the cover cap 6, that is to say a cover cap 6 with a housing that is open at both ends, it may be expedient to design the springs 12 such that, in the installed state, they produce exclusively the orthogonal components 19. By way of example, each spring 12 is supported in a first contact zone in the area of the lateral web 13 orthogonally on the assembly 5, and is supported via a corresponding second contact zone in an area of the ends 4 adjacent to the lateral web 13. This likewise makes it possible to produce sufficiently high pulling-off forces in order to achieve the desired plug-on security for the cover cap 6.

The cover cap 6 according to the invention can be fitted particularly easily, since it just has to be plugged onto the assembly 5. The suitable configuration of the spring device 8 results in the cover cap 6 in this case automatically being secured on the assembly 5. At the same time, the spring device 8 can achieve desired positioning, in particular centering, of the cover cap 6 relative to the assembly 5. This considerably reduces the amount of production effort for the stator 1.

What is claimed is:

1. A cover cap arrangement comprising:
   an assembly having two winding bar ends of an electrical machine stator, the two ends being electrically conductively connected to each other;
   an electrically insulating housing pluggable onto the assembly in an installed state so as to circumferentially sheath at least one of the two winding bar ends; and
   a spring device including at least two springs disposed in an interior of the housing wherein, in the installed state, the springs secure the assembly between the springs, are supported by at least one of the two winding bar ends and by the housing and provide a holding force fixing the housing to the assembly, the holding force having a force component acting orthogonally on at least one of the housing and the assembly.

2. The cover cap arrangement as recited in claim 1, wherein the spring device includes at least one spring in the form of a wave spring washer.

3. The cover cap arrangement as recited in claim 1, wherein the spring device includes at least one spring including at least one of a plastic and a fiber-reinforced plastic.

4. The cover cap arrangement as recited in claim 1, wherein the spring device includes at least one spring provided with a semiconducting coating so as to reduce the corona effect.

5. The cover cap arrangement as recited in claim 1, further comprising an adhesive bonding the housing to the assembly in the installed state.

6. The cover cap arrangement as recited in claim 1, wherein the housing includes a plastic and wherein the spring device include at least one spring embedded in the plastic.

7. The cover cap arrangement as recited in claim 1, wherein the spring device includes at least one spring attached to the housing projecting into the housing interior, the spring being loaded in the installed state and supported on outside of the assembly.

8. The cover cap arrangement as recited in claim 7, wherein the housing is open at both ends.

9. The cover cap arrangement as recited in claim 1, wherein the spring device includes at least one spring attached to the housing and projecting into the housing interior, and wherein, in the installed state, the spring engages behind an undercut formed on the assembly.

10. The cover cap arrangement as recited in claim 9, wherein the undercut is formed on a lateral web of the assembly, the two ends being connected to each other by the lateral web and otherwise separated from each other.

11. The cover cap arrangement as recited in claim 9, wherein the housing has a contour projecting inwards and wherein the holding force includes a force component urges a housing contour of the housing a respective assembly contour of the assembly.

12. The cover cap arrangement as recited in claim 11, wherein the housing contour is formed by a base of the housing that closes an end of the housing and the assembly contour being formed by one end of the assembly.

13. A stator of an electrical machine comprising:
    a stator winding including a plurality of winding bars each having ends, at least two of the plurality of winding bars being electrically conductively connected to one another at respective ends so as to an assembly;
    a cover cap covering the assembly, wherein the cover cap includes an electrically insulating housing pluggable onto the assembly in an installed state so as to circumferentially sheath the assembly, and a spring device including at least two springs disposed in an interior of the housing wherein, in the installed state, the springs secure the assembly between the springs, are supported by at least one of the two winding bar ends and by the housing, and provide a holding force fixing the housing to the assembly, the holding force having a force component acting orthogonally on at least one of the housing and the assembly.

14. A cover cap arrangement comprising:
    an assembly having two winding bar ends of an electrical machine stator, the two ends being electrically conductively connected to each other;
    an electrically insulating housing pluggable onto the assembly in an installed state so as to circumferentially sheath at least one of the two winding bar ends; and
    a spring device including at least one spring disposed in an interior of the housing attached to the housing an projecting into the housing interior, wherein, in the installed state, the at least one spring engages behind an undercut formed on the assembly, is supported by at least one of the two winding bar ends and by the housing, and provides a holding force fixing the housing to the assembly, the holding force having a force component acting orthogonally on at least one of the housing and the assembly.

15. The cover cap arrangement as recited in claim 14, wherein the housing is open at both ends.

16. The cover cap arrangement as recited in claim 14, wherein the housing has a contour projecting inwards and wherein the holding force includes a force component urges a housing contour of the housing a respective assembly contour of the assembly.

17. The cover cap arrangement as recited in claim 14, wherein the spring device includes at least one spring in the form of a wave spring washer.

18. The cover cap arrangement as recited in claim 14, wherein the spring device includes at least one spring including at least one of a plastic and a fiber-reinforced plastic.

19. The cover cap arrangement as recited in claim 14, wherein the spring device includes at least one spring provided with a semiconducting coating so as to reduce the corona effect.

20. The cover cap arrangement as recited in claim 14, further comprising an adhesive bonding the housing to the assembly in the installed state.

* * * * *